(12) United States Patent
Talton (10) Patent No.: US 9,641,405 B2
(45) Date of Patent: May 2, 2017

(54) SYSTEM AND METHOD FOR SEQUENCING PER-HOP DATA IN PERFORMANCE-MONITORED NETWORK ENVIRONMENTS

(75) Inventor: John Pierce Talton, Carthage, NC (US)

(73) Assignee: CA, Inc., New York, NY (US)

( * ) Notice: Subject to any disclaimer, the term of this patent is extended or adjusted under 35 U.S.C. 154(b) by 1310 days.

(21) Appl. No.: 13/484,673

(22) Filed: May 31, 2012

(65) Prior Publication Data

US 2013/0326049 A1    Dec. 5, 2013

(51) Int. Cl.
*G06F 15/173* (2006.01)
*H04L 12/26* (2006.01)
*H04L 12/733* (2013.01)
*H04L 12/701* (2013.01)

(52) U.S. Cl.
CPC .............. *H04L 43/04* (2013.01); *H04L 45/00* (2013.01); *H04L 45/20* (2013.01)

(58) Field of Classification Search
CPC ......... H04L 43/04; H04L 43/08; H04L 45/20; H04L 45/70; H04L 45/00

USPC ........ 700/28; 370/230, 249, 238, 389; 714/4
See application file for complete search history.

(56) References Cited

U.S. PATENT DOCUMENTS

| | | | |
|---|---|---|---|
| 6,192,404 B1* | 2/2001 | Hurst | H04L 45/00 370/238 |
| 2002/0177910 A1* | 11/2002 | Quarterman et al. | 700/28 |
| 2006/0143496 A1* | 6/2006 | Silverman | 714/4 |
| 2007/0076605 A1* | 4/2007 | Cidon et al. | 370/230 |
| 2007/0153782 A1* | 7/2007 | Fletcher | H04J 3/1617 370/389 |
| 2012/0113820 A1* | 5/2012 | Umayabashi et al. | 370/249 |

* cited by examiner

*Primary Examiner* — Dustin Nguyen
(74) *Attorney, Agent, or Firm* — Baker Botts L.L.P.

(57) ABSTRACT

A method includes asynchronously collecting performance data from distributed devices. The performance data includes information associated with a particular data stream that transits each of the distributed devices. The method further includes ordering the performance data in accordance with a specific metric included in the performance data. The method further includes generating a per-hop perspective of the ordered performance data.

18 Claims, 7 Drawing Sheets

| PERFORMANCE DATA AS COLLECTED ||||||
| Order Received | Device | Performance Data |||
| | | TTL (s) | Byte Rate (Mbps) | Latency (µs) |
|---|---|---|---|---|
| 1 | 104 | 7 | 23.6 | 653 |
| 2 | 105 | 2 | 29.3 | 490 |
| 3 | 103 | 15 | 25.2 | 974 |
| 4 | 103 | 13 | 18.6 | 815 |
| 5 | 105 | 1 | 30.1 | 458 |
| 6 | 104 | 6 | 27.5 | 610 |
| 7 | 105 | 3 | 28.8 | 560 |
| 8 | 103 | 14 | 18.5 | 906 |
| 9 | 104 | 9 | 21.9 | 699 |
| 10 | 103 | 12 | 20.7 | 775 |

FIGURE 6A

| PER-HOP PERSPECTIVE OF PERFORMANCE DATA ||||||
| Order Received | Device | Performance Data |||
| | | TTL (s) | Byte Rate (Mbps) | Latency (µs) |
|---|---|---|---|---|
| 3 | 103 | 15 | 25.2 | 974 |
| 8 | 103 | 14 | 18.5 | 906 |
| 4 | 103 | 13 | 18.6 | 815 |
| 10 | 103 | 12 | 20.7 | 775 |
| 9 | 104 | 9 | 21.9 | 699 |
| 1 | 104 | 7 | 28.8 | 560 |
| 6 | 104 | 6 | 27.5 | 610 |
| 7 | 105 | 3 | 23.6 | 653 |
| 2 | 105 | 2 | 29.3 | 490 |
| 5 | 105 | 1 | 30.1 | 458 |

FIGURE 6B

| Device | Average TTL (s) |
|--------|-----------------|
| 103 | 13.5 |
| 104 | 7.3 |
| 105 | 2.0 |

FIGURE 7

SYSTEM AND METHOD FOR SEQUENCING PER-HOP DATA IN PERFORMANCE-MONITORED NETWORK ENVIRONMENTS

BACKGROUND

The present disclosure relates to network environments and, more specifically, to a system and method for sequencing per-hop data in performance-monitored network environments.

Existing performance-monitored networks include devices within the network topology that have extended performance-monitoring capabilities enabled. These devices collect per-stream statistics and report on them to a central collection device. Such reporting is made possible by extending the report data set for standard Flexible NetFlow to include a dynamic set of metrics per stream. Device reports are sent periodically, at an interval that is configurable per device. Devices often report statistics every 30 seconds.

The devices may be part of a medianet. The medianet is an end-to-end IP architecture that helps to enable pervasive media experiences. The medianet serves as an intelligent network optimized for rich media, such as data streams including audio streams and video streams. The medianet detects media transiting through a network and optimizes network performance for the media, based on the type of media detected. Further, the medianet automatically detects and configures network endpoints to optimally handle detected media, and the medianet detects and responds to changes in device, connection, and service availability.

NetFlow is a network protocol developed by Cisco Systems, Inc. for collecting internet protocol ("IP") traffic information. Devices, such as routers and switches, that support NetFlow may collect IP traffic statistics on interfaces where NetFlow is enabled. Such devices may later export the collected IP traffic statistics as NetFlow records to a NetFlow collector. Flexible Netflow is an extension of NetFlow that provides users with the ability to choose the types of IP traffic information to collect and to selectively export IP traffic statistics based on the users' information preferences and requirements.

Cisco Systems, Inc. has developed a tool, known as Mediatrace, for monitoring medianet environments and providing per-stream information. Mediatrace allows a user to determine path information about a data stream. Nevertheless, Mediatrace must be run on demand to and from specific nodes within the network, and Mediatrace provides no additional hop information beyond an accurate hop path between the specific nodes. Thus, systems implementing Mediatrace sequence data out of band and overlay the relevant IP traffic information on the hop path determined by Mediatrace.

BRIEF SUMMARY

According to one aspect of the present disclosure, a method may comprise asynchronously collecting performance data, from a plurality of distributed devices. The performance data may comprise information associated with a particular data stream that transits each of the plurality of distributed devices. The method further may comprise ordering the performance data in accordance with a specific metric comprised in the performance data. The method further may comprise generating a per-hop perspective of the ordered performance data.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®. EIFFEL®, JADE®, EMERALD®, C++, C#, VB.NET, PYTHON® or the like, conventional procedural programming languages, such as the "C" programming language, VISUAL BASIC®. FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

Referring now to performance-monitored networks, the known method of performance monitoring may be enabled on many types of devices, at varying locations within the overall network topology. Devices that are interior to the network topology and serve as part of the path that data streams take though the network may be of particular interest. Such data streams may be audio and/or video streams that may contain relevant metrics, which may provide useful information regarding the performance characteristics of the data stream.

Devices in the network that are enabled for performance monitoring may report on per-stream metrics; however, these devices may not correlate among themselves, and these devices may not perform sequencing or timing across devices. Thus, a central collection device that receives such performance reports from the devices in the network may receive intermittent unordered data associated with many streams across many devices. Although the known method of performance monitoring may provide access to information on a per-device view, the known method of performance monitoring may not provide ordered, discrete, per-stream information.

Known methods for displaying and analyzing performance-monitored data may utilize an auxiliary method to capture the path and topology information. Such auxiliary methods may require complete network discovery or may require other data to piece together the path and topology of the performance-monitored network. Further, such auxiliary methods may be time consuming and may require a significant secondary infrastructure. Other solutions may utilize Mediatrace technology to acquire the path information; however, Mediatrace must be run on demand to and from specific nodes within the network. A secondary (manual or automated) process then is required to trigger the Mediatrace. Mediatrace may provide no additional hop information (besides accurate path) and may be costly in terms of setup, running, and maintenance of the instances of such a trace. Topology may provide a much deeper and more accurate view of the network, but topology may come with a high cost: the time to build the model, the resources required to build the model, and the problems associated with integrating the model into a common product offering.

Accordingly, known methods for providing per-stream information, such as Mediatrace, may sequence data out of band and may overlay the relevant metrics on top of the out-of-band-sequenced data. Such implementations, however, may be cumbersome, may be costly in both time and resources, and may not allow for simple autonomous implementation and interpretation of the rich data provided to the collection device.

Figure 1:
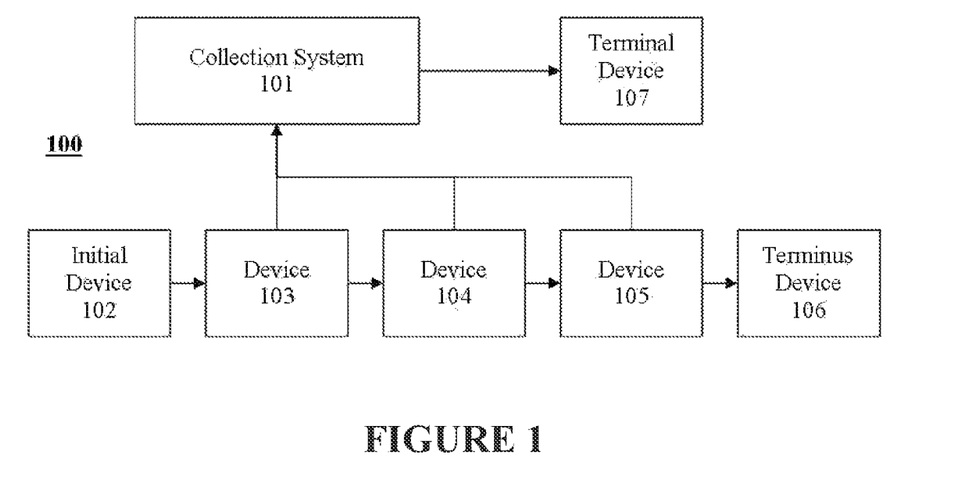
FIG. 1 illustrates a performance-monitored network of devices.

Referring now to FIG. 1, a performance-monitored network 100 now is described. FIG. 1 depicts a group of network devices 102, 103, 104, 105, and 106, which may transmit and receive data through communication therebetween. Network devices 102, 103, 104, 105, and 106 may communicate through one or more wireless or wireline communication methods. Although each of network devices 102, 103, 104, 105, and 106 may communicate with each of the others of network devices 102, 103, 104, 105, and 106, FIG. 1 depicts the path of a particular data stream hopping (e.g., transiting) through network devices 102, 103, 104, 105, and 106 from an initial device 102 to a terminus device 106. The particular data stream may be, for example, an audio stream or a video stream. Initial device 102 may be, for example, a server configured to serve data to devices connected to performance-monitored network 100. Terminus device 106 may be, for example, a user terminal, such as a mobile phone, a tablet computer, a laptop computer, a desktop computer, an audio receiving system, a television, or another type of terminal device, configured to display video data or play audio data received from a server. Devices 103, 104, and 105 may be, for example, access points, routers, switches, intermediate servers, or other devices through which a data stream may hop from initial device 102 to terminus device 106. Devices 103, 104, and 105 may be configured to transmit performance data using the Flexible Netflow protocol, or another protocol for transmitting performance data. Further, while the particular data stream depicted in FIG. 1 hops along a path from initial device 102 to device 103 to device 104 to device 105 to terminus device 106, a data stream may hop among the devices in a different path, such as, for example, from initial device 102 to device 104 to device 105 to device 103 to terminus device 106 or from initial device 102 to device 105 to device 103 to device 104 to terminus device 106. Moreover, without specialized components configured to map the performance-monitored network and track the flow of data throughout, it may be difficult to determine the actual path taken by a particular data stream.

Performance-monitored network 100 also may comprise a collection system 101 configured to collect performance data from each of devices 103, 104, and 105, which may be interior devices of the performance-monitored network 100. The performance data may comprise, for example, a number of packets hopping through each of devices 103, 104, and 105; a byte rate of data hopping through each of devices 103, 104, and 105; and stream information regarding a data stream hopping through each of devices 103, 104, and 105. The stream information may comprise information regarding the latency of the data stream at each of devices 103, 104, and 105; a jitter buffer value associated with the data stream at each of devices 103, 104, and 105; and a Time to Live ("TTL") value associated with the data stream at each of devices 103, 104, and 105. In certain aspects of the invention, particular performance data also may comprise data identifying which of devices 103, 104, and 105 provided the particular performance data.

The TTL value is a counter or timestamp field attached to or embedded in a particular piece of data. The TTL value may be set by a sender of the data, and may be reduced each time the data hops to a subsequent network device (e.g., a router) on the path to a particular destination. When the counter has been reduced to zero or the set timespan has elapsed and the data has not reached the particular destination, the data may be discarded before reaching the particular destination. Utilizing the TTL value may prevent data from circulating a network indefinitely.

Devices 103, 104, and 105 may provide performance data to collection system 101 for collection in an asynchronous manner. Thus, while data associated with the particular data stream may hop from initial device 102 to device 103 to device 104 to device 105 to terminus device 106, collection system 101 may, for example, collect performance data from device 105 before collecting performance data from devices 103 and 104. Accordingly, the order in which collection system 101 collects performance data associated with the particular data stream may not reliably provide information about the actual path followed by the particular data stream as the particular data stream hops among devices 103, 104, and 105.

As described below, with respect to FIGS. 3-5, collection system 101 may collect performance data from each of devices 103, 104, and 105, order the performance data, generate a per-hop perspective of the performance data, and transmit the ordered performance data arranged in the per-hop perspective to a terminal device 107, which a user may use to visualize the performance data associated with a data stream arranged in the per-hop perspective. The per-hop perspective may approximate the actual path of the data stream and may assist the user in monitoring the network and identifying network failures or disruptions. In certain configurations, collection system 101 may comprise terminal device 107. In other configurations, collection system 101 may output the ordered performance data arranged in the per-hop perspective to a device other than terminal device 107, such that the ordered performance data arranged in the per-hop perspective may be accessed by other systems or devices prior to or in lieu of a user.

Figure 2:
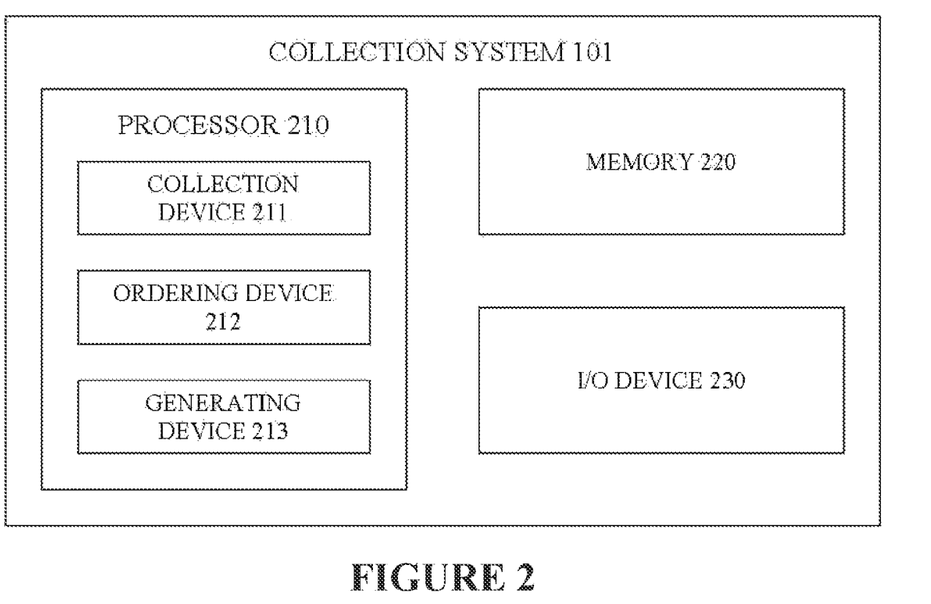
FIG. 2 is a schematic representation of a collection system configured to receive performance data from network devices.

Referring now to FIG. 2, a configuration of collection system 101 now is described. Collection system 101 may comprise a processor 210, a memory 220, and an input and output ("I/O") device 230. Memory 220 may store computer-readable instructions for controlling collection system 101 to perform certain processes. Further, memory 220 may store data collected by collection system 101, as well as data generated by collection system 101. Computer-readable instructions stored in memory 220 may control processor 210 to act as a collection device 211, an ordering device 212, and a generating device 213. Processes performed by collection device 211, ordering device 212, and generating device 213 are described later herein, with respect to FIGS. 3-5. I/O device 230 may act as a transmitter and receiver, which collection system 101 may utilize to collect performance data from devices 103, 104, and 105, and which collection system 101 may utilize to send data generated or organized thereon to other devices, such as terminal device 107.

Figure 3:
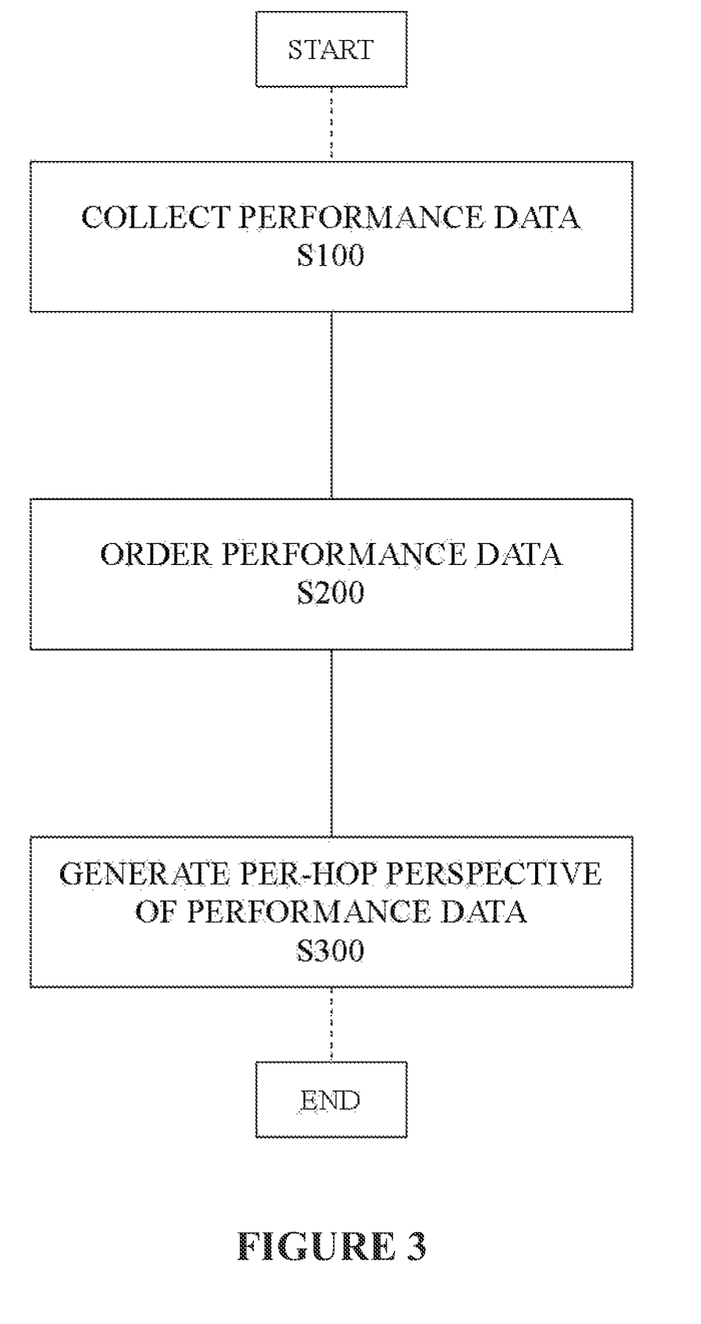
FIG. 3 illustrates a process of collecting and ordering performance data and generating a per-hop perspective of the performance data.

Referring now to FIGS. 3-5, processes performed by collection device 211, ordering device 212, and generating device 213 now are described. FIG. 3 depicts a process of collecting and ordering performance data and generating a per-hop perspective of the performance data performed by, for example, collection system 101. In S100, collection system 101 may collect performance data from devices 103, 104, and 105. In S200, collection system 101 may order the collected performance data according to the TTL value associated with each piece of performance data. In S300, collection system 101 may generate a per-hop perspective of the performance data corresponding to the particular data stream. The per-hop perspective may allow a user to visualize the collected performance data in a point-to-point flow through devices 103, 104, and 105 that approximates the actual path transited by the particular data stream. Thus, by implementing the process depicted in FIG. 3, a network administrator may approximate the path followed by a particular data stream and may more easily identify network failures and disruptions without implementing more costly and resource-intensive methods.

Figure 4:
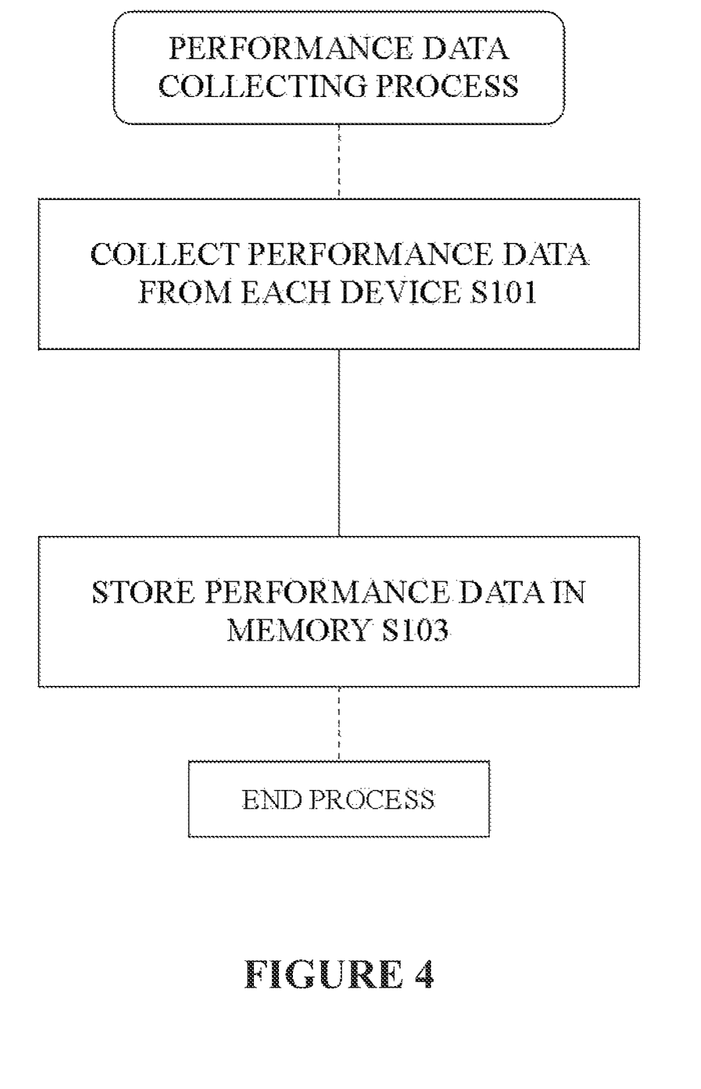
FIG. 4 illustrates a performance data collecting process.
Figure 6A:
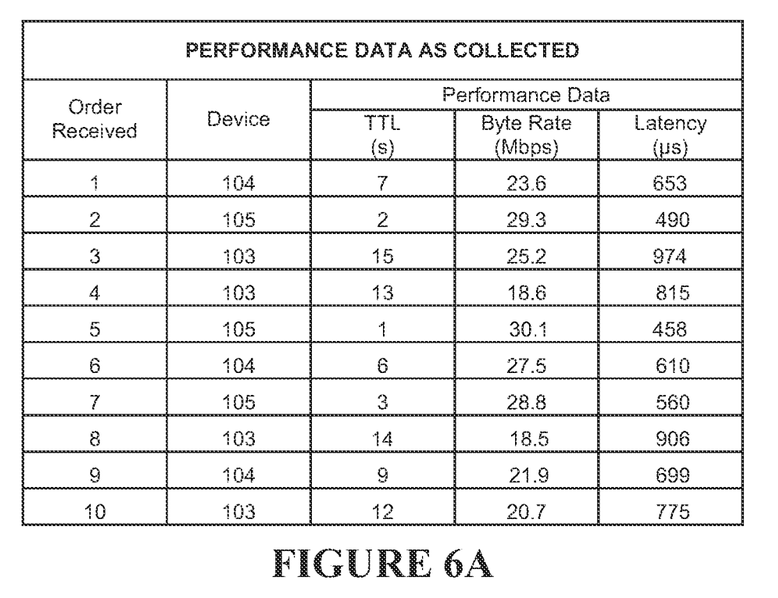
FIG. 6A is a table depicting examples of asynchronously collected performance data listed in the order collected.

Referring to FIG. 4, which provides a detailed view of S100, collection system 101 may collect performance data associated with a particular data stream from each of devices 103, 104, and 105 in S101. Collection system 101 may store the entirety of the collected performance data that is collected during the particular data stream in memory 220 in S103. FIG. 6A depicts an example of a portion of performance data associated with a particular data stream collected from devices 103, 104, and 105.

Figure 5:
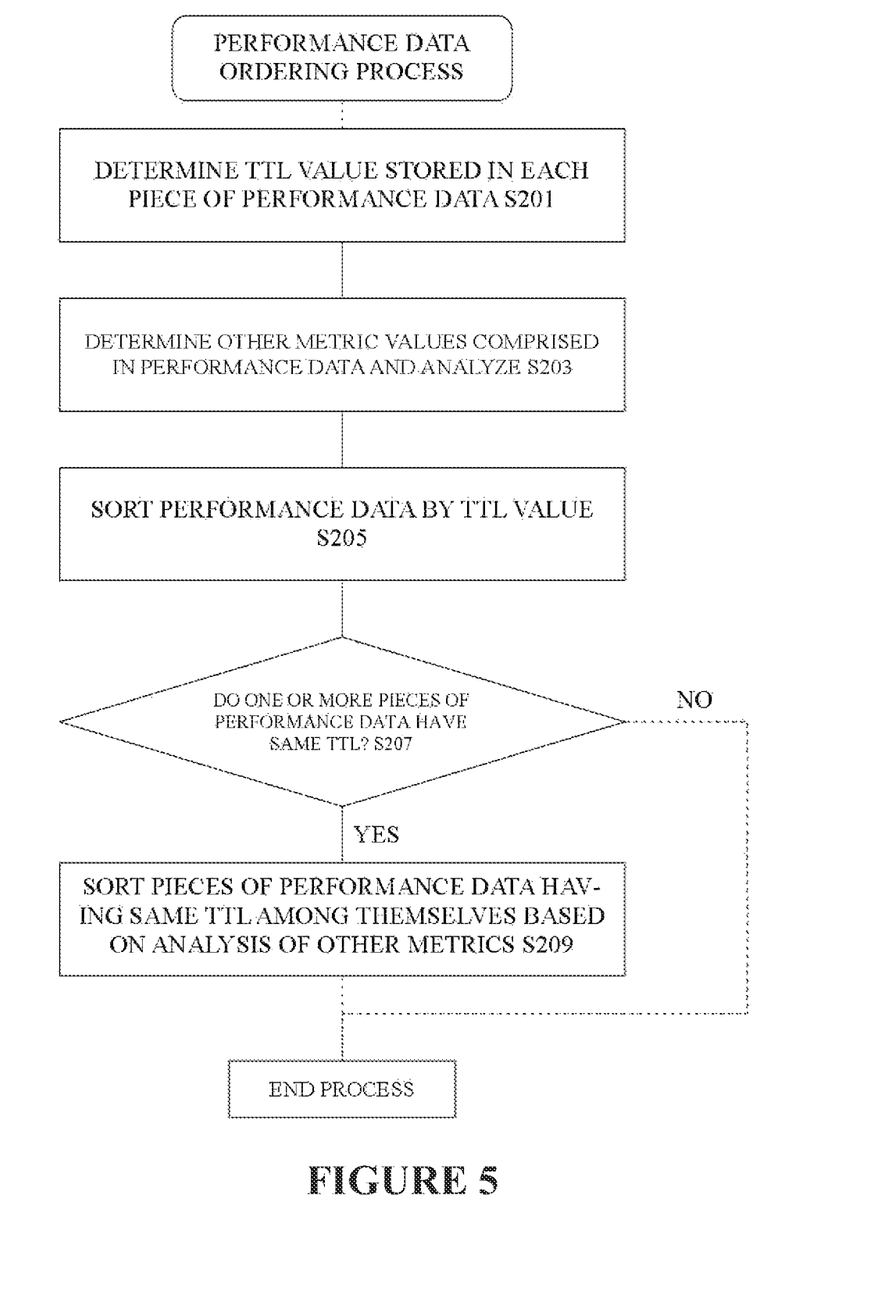
FIG. 5 illustrates a performance data ordering process.

Referring to FIG. 5, which provides a detailed view of S200, collection system 101 may determine the TTL value associated with each piece of performance data stored in memory 220 in S201. In some aspects of the disclosure, in S201, collection system 101 also may analyze the TTL values associated with each piece of performance data and determine statistical information about the TTL values associated with each of devices 103, 104, and 105 and corresponding to the particular data stream. In S203, collection system 101 also may determine values of other performance metrics associated with each piece of performance data stored in memory 220, and collection system 101 may analyze the values of the other metrics and determine additional statistical information about the other metrics corresponding to the particular data stream. In some aspects of the invention, the additional statistical information about the other metrics may be associated with each of devices 103, 104, and 105.

In S205, collection system 101 may sort the performance data stored in memory 220 and corresponding to the particular data stream based on the TTL values determined in S201. Specifically, in an aspect of the disclosure, collection system 101 may sort the performance data in order of decreasing or increasing TTL values, such that the greatest TTL values correspond to performance data at the beginning of the approximated per-hop path and the smallest TTL values correspond to performance data at the end of the approximated per-hop path.

In S207, collection system 101 may determine whether one or more pieces of the performance data have the same TTL values. When collection system 101 determines that one or more pieces of the performance data do not have the same TTL values (S207: NO), the performance data ordering process may end. When collection system 101 determines that one or more pieces of the performance data have the same TTL values (S207: YES), collection system 101 may sort the one or more pieces of the performance data that have the same TTL values based on the additional statistical information about the other metrics determined in S203 (e.g., average values, median values, ranges, or other values determined from a statistical analysis of one or more of the other metrics). Consequently, collection system 101 may combine the one or more pieces of the performance data sorted by the additional statistical information about the other metrics with the performance data sorted by TTL value.

Alternatively or additionally, in S207, collection system 101 may determine whether one or more pieces of the performance data have inconsistent TTL values. When collection system 101 determines that one or more pieces of the performance data do not have inconsistent TTL values (S207: NO), the performance data ordering process may end. When collection system 101 determines that one or more pieces of the performance data have inconsistent TTL values (S207: YES), collection system 101 may sort the one or more pieces of the performance data that have inconsistent TTL values based on the additional statistical information about the other metrics determined in S203 (e.g., average values, median values, ranges, or other values determined from a statistical analysis of one or more of the other metrics). Consequently, collection system 101 also may combine the one or more pieces of the performance data sorted by the additional statistical information about the other metrics with the performance data sorted by TTL value.

Figure 6B:
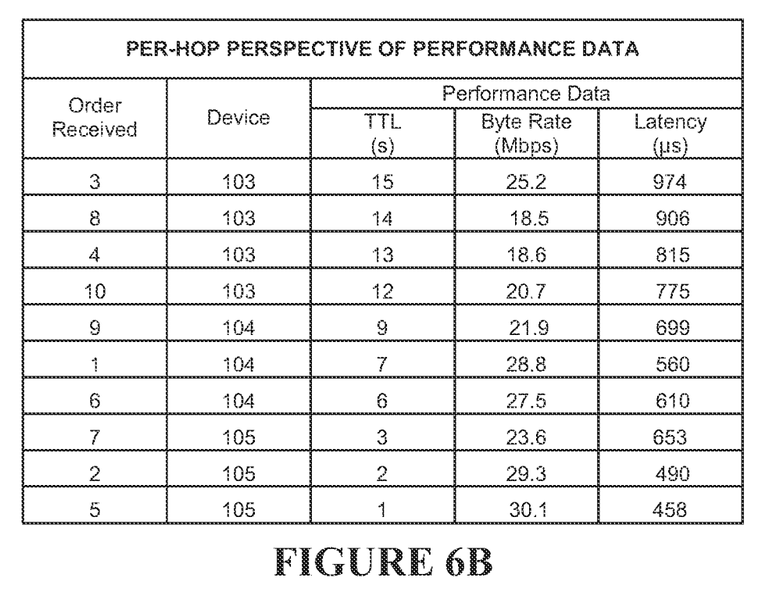
FIG. 6B is a table depicting the examples of asynchronously collected performance data of FIG. 6A arranged in a per-hop perspective.

FIG. 6B depicts the portion of performance data depicted in FIG. 6A ordered by TTL value after performance data ordering process S200. Collection system 101 may utilize the performance data ordered by TTL value to generate a per-hop perspective of the performance data associated with the particular data stream. In particular, collection system 101 may generate a visualization of the performance data, such that a user may view the performance data in a linear fashion at each point in a per-hop sequence that approximates the path followed by the particular data stream. For example, the per-hop perspective may depict first the performance data associated with device 103 because device 103 is associated with the greatest TTL values. Further, the per-hop perspective may depict last the performance data associated with device 105 because device 105 is associated with the smallest TTL values. Moreover, the per-hop perspective may depict in the middle the performance data associated with device 104 because device 104 is associated with the middle range of performance data. In certain aspects of the disclosure, the per-hop perspective may be a list of all performance data associated with a particular data stream, as depicted in FIG. 6B. In other aspects of the disclosure, the per-hop perspective may group the performance data associated with each of devices 103, 104, and 105, and display the grouped performance data corresponding to each device separately. Such groupings of performance data may be listed in an order corresponding to the approximated position of each device along the path followed by the particular data stream.

Figure 7:
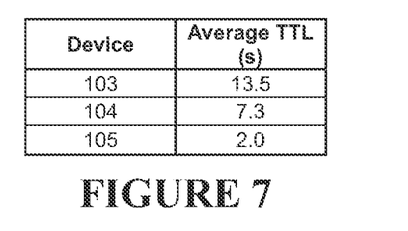
FIG. 7 is a table depicting average TTL values associated with the performance data corresponding to each device based on the example data listed in FIGS. 6A and 6B.

In some aspects of the disclosure, the performance data may comprise data identifying which of devices 103, 104, and 105 provides particular performance data (e.g., the "Device" column in FIG. 6A). Collection system 101 may determine an average TTL value for each of devices 103, 104, and 105 from the performance data corresponding to the particular data stream. For example, FIG. 7 depicts a listing of the average TTL for each of devices 103, 104, and 105, based on the collected performance data depicted in FIG. 6A. Collection system may then determine the per-hop path of the particular data stream by sorting devices 103, 104, and 105 by average TTL value, such that the device with the greatest average TTL value is approximated as the first interior node in the per-hop path (e.g., device 103) and the device with the smallest average TTL value is approximated as the final interior node in the per-hop path (e.g., device 105). Collection system 101 may sort the performance data according to the device associated with each piece of performance data. In some further aspects of the disclosure, collection system 101 may further sort the performance data associated with each device according to the additional statistical information about the other metrics. Collection system 101 may generate a per-hop perspective of the performance data by displaying the performance data corresponding to the first internal node (e.g., device 103), followed by the performance data corresponding to the middle internal node (e.g., device 104), and followed by the performance data corresponding to the third internal node (e.g., device 105).

In above-described aspects of the disclosure, collection system 101 may be configured to collect performance data from devices 103, 104, and 105. Nevertheless, collection system 101 may collect performance data from a plurality of network devices comprising two or more network devices.

In above-described aspects of the disclosure, collection system 101 may collect performance data comprising a number of packets hopping through each monitored device; a byte rate of data hopping through each monitored device; and stream information regarding a data stream hopping through each monitored device, wherein the stream information may comprise information regarding the latency of the data stream at each monitored device; a jitter buffer value associated with the data stream at each monitored device; and a TTL value associated with the data stream at each monitored device. Nevertheless, the performance data may comprise all, some, or none of the above-described performance metrics in addition to other available performance metrics generated by a system such as Flexible Netflow.

As described above, aspects of the disclosure described herein may utilize the existence of a TTL field within a performance-monitor dataset. Using this per-hop informational packet the otherwise-random, per-hop datasets may be arranged into a soft path, which may approximate a path followed by the data stream. Because the TTL value associated with a data stream decrements per hop, ordering of data within a particular hop set may be approximated based on decreasing TTL values. Nevertheless, performance metrics other than TTL values may be used to order the performance-monitor dataset and to arrange the per-hop datasets.

Utilizing the TTL value may approximate the path accurately enough to provide information to an interface through I/O device 230, such that rich and useful datasets may be built. In the presence of more complete topology or path information, this data may help to inform and augment those topologies in order to build more accurate models.

In order to provide the most accurate and up-to-date information based on the TTL sequence, this method may store all the per-hop metrics per stream within a database in memory 220 during the duration of the stream. Thus, it may be possible to use the full set of data to create the most accurate path information, and all metrics across all devices may be selected for a particular stream. This data then may be statistically analyzed and sequenced based on the TTL. Because the data is stored and indexed within the database, sequencing may be performed when the user requests it. This may provide the flexibility to sort and analyze the data further, as needed, in real time.

The method described herein may identify the most probable sequence for anomalous data caused by inconsistent or duplicate TTL. Generally, this method may provide enough information for the user to identify the point in the path at which network degradation occurred. A more in-depth investigation of the issues may be achieved with other methodologies that utilize more resources at a higher cost. It may be recognized that the TTL behavior within a specific network is understood by those who maintain the specific network. Anomalous data may be understood in such a context. The TTL-based method described herein may not forcibly demonstrate instances of anomalous behavior and therefore may provide highly useful data with less overhead than other resource-intensive methods.

An advantage of a descending TTL sequencing of per-hop medianet data is that such a sequencing method may provide a high level of confidence in the path of a stream at an extremely low cost of implementation. Such a sequencing method may utilize existing data collected from the medianet functionality and may not require a secondary external resource to construct the approximate path information.

The flowcharts and block diagrams in FIGS. 1-5 illustrate the architecture, functionality, and operation of possible implementations of systems, methods and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
asynchronously collecting performance data from a plurality of distributed devices, wherein the performance data comprises information associated with a particular data stream that transits each of the plurality of distributed devices;
ordering the performance data in accordance with a specific metric comprised in the performance data, wherein the specific metric comprises a respective measurement of a time to live associated with the particular data stream, as measured in seconds at each of the plurality of distributed devices; and
generating a per-hop perspective of the ordered performance data by outputting, at a user interface, the performance data in decreasing order of the respective measurement of the time to live, to approximate a path of the particular data stream though the plurality of distributed divices.

2. The method of claim 1,
wherein asynchronously collecting performance data from the plurality of distributed devices comprises:
asynchronously receiving performance data from each of the plurality of distributed devices; and
storing the performance data received from each of the plurality of distributed devices over the duration of the data stream in a database, and wherein ordering the performance data in accordance with the specific metric comprised in the performance data comprises:
sequencing each piece of the performance data stored in the database based on a value of the specific metric associated with each piece of the performance data when a request to sequence the performance data is received.

3. The method of claim 1, wherein ordering the performance data in accordance with the specific metric comprised in the performance data comprises:
determining a value of the time to live metric comprised in each piece of the collected performance data associated with the particular data stream; and
sequencing the pieces of the collected performance data associated with the particular data stream based on decreasing value of the time to live metric.

4. The method of claim 3, wherein sequencing the pieces of the collected performance data associated with the particular data stream further comprises:
analyzing another metric comprised in each piece of the collected performance data using a statistical analysis; and
sequencing pieces of the collected performance data comprising a same value of the time to live metric based on the statistical analysis of the other metric comprised in each piece of the collected performance data.

5. The method of claim 1, wherein generating the per-hop perspective of the ordered performance data comprises:
generating a listing of pieces of the performance data associated with the data stream at each device of the plurality of distributed devices along a hopping path that the data stream follows from an initial device to a terminus device,
wherein the listing of pieces of the performance data comprises the pieces of the performance data listed in an order approximating the hopping path that the data stream follows from the initial device to the terminus device.

6. The method of claim 1, wherein the particular data stream is a video stream.

7. A system comprising:
a collection device configured to asynchronously collect performance data from a plurality of distributed devices, wherein the performance data comprises information associated with a particular data stream that transits each of the plurality of distributed devices;
an ordering device configured to order the performance data in accordance with a specific metric comprised in the performance data, wherein the specific metric comprises a respective measurement of a time to live associated with the particular data stream, as measured in seconds at each of the plurality of distributed devices; and
a generating device configured to generate a per-hop perspective of the ordered performance data by outputting, at a user interface, the performance data in decreasing order of the respective measurement of the time to live, approximate a path of particular data stream through the plurality of distributed devices.

8. The system of claim 7,
wherein the collection device is configured to asynchronously collect the performance data from the plurality of distributed devices by:
asynchronously receiving performance data from each of the plurality of distributed devices; and
storing the performance data received from each of the plurality of distributed devices over the duration of the data stream in a database, and
wherein the ordering device is configured to order the performance data in accordance with the specific metric by:
sequencing each piece of the performance data stored in the database based on a value of the specific metric associated with each piece of the performance data when a request to sequence the performance data is received.

9. The system of claim 7, wherein the ordering device is configured to order the performance data in accordance with the specific metric comprised in the performance data by:
determining a value of the time to live metric comprised in each piece of the collected performance data associated with the particular data stream; and
sequencing the pieces of the collected performance data associated with the particular data stream based on decreasing value of the time to live metric.

10. The system of claim 9, wherein the ordering device is configured to sequence the pieces of the collected performance data associated with the particular data stream by:
analyzing another metric comprised in each piece of the collected performance data using a statistical analysis; and
sequencing pieces of the collected performance data comprising a same value of the time to live metric based on the statistical analysis of the other metric comprised in each piece of the collected performance data.

11. The system of claim 7, wherein the generating device is configured to generate the per-hop perspective of the ordered performance data by:
generating a listing of pieces of the performance data associated with the data stream at each device of the plurality of distributed devices along a hopping path that the data stream follows from an initial device to a terminus device,
wherein the listing of pieces of the performance data comprises the pieces of the performance data listed in an order approximating the hopping path that the data stream follows from the initial device to the terminus device.

12. The system of claim 7, wherein the particular data stream is a video stream.

13. A computer program product comprising:
a non-transitory computer readable storage medium having computer readable program code embodied therewith, the computer readable program code comprising:
computer readable program code configured to asynchronously collect performance data from a plurality of distributed devices, wherein the performance data comprises information associated with a particular data stream that transits each of the plurality of distributed devices;
computer readable program code configured to order the performance data in accordance with a specific metric comprised in the performance data, wherein the specific metric comprises a respective measurement of a time to live associated with the particular data stream, as measured in seconds at each of the plurality of distributed devices;
computer readable program code configured to generate a per-hop perspective of the ordered performance data by outputting, at a user interface, the performance data in decreasing order of the respective measurement of the time to live, to approximate a path of the particular data stream through the plurality of distributed devices.

14. The computer program product according to claim 13, wherein the computer readable program code configured to asynchronously collect performance data from the plurality of distributed devices comprises:
computer readable program code configured to asynchronously receive performance data from each of the plurality of distributed devices; and
computer readable program code configured to store the performance data received from each of the plurality of distributed devices over the duration of the data stream in a database, and
wherein the computer readable program code configured to order the performance data in accordance with the specific metric comprised in the performance data comprises:
computer readable program code configured to sequence each piece of the performance data stored in the database based on a value of the specific metric associated with each piece of the performance data when a request to sequence the performance data is received.

15. The computer program product according to claim 13, wherein the computer readable program code configured to order the performance data in accordance with the specific metric comprised in the performance data comprises:
computer readable program code configured to determine a value of the time to live metric comprised in each piece of the collected performance data associated with the particular data stream; and
computer readable program code configured to sequence the pieces of the collected performance data associated with the particular data stream based on decreasing value of the time to live metric.

16. The computer program product according to claim 15, wherein the computer readable program code configured to sequence the pieces of the collected performance data associated with the particular data stream further comprises:
computer readable program code configured to analyze another metric comprised in each piece of the collected performance data using a statistical analysis; and
computer readable program code configured to sequence pieces of the collected performance data comprising a same value of the time to live metric based on the statistical analysis of the other metric comprised in each piece of the collected performance data.

17. The computer program product according to claim 13, wherein the computer readable program code configured to generate the per-hop perspective of the ordered performance data comprises:
computer readable program code configured to generate a listing of pieces of the performance data associated with the data stream at each device of the plurality of distributed devices along a hopping path that the data stream follows from an initial device to a terminus device,
wherein the listing of pieces of the performance data comprises the pieces of the performance data listed in an order approximating the hopping path that the data stream follows from the initial device to the terminus device.

18. The computer program product according to claim 13, wherein the particular data stream is a video stream.

* * * * *